United States Patent
Kimura (10) Patent No.: US 9,344,588 B2
(45) Date of Patent: May 17, 2016

(54) INFORMATION PROCESSING APPARATUS AND CONTROL METHOD FOR SPECIFYING AT LEAST ONE IDENTIFIER OF CONTENTS

(71) Applicant: CANON KABUSHIKI KAISHA, Tokyo (JP)

(72) Inventor: Masahiko Kimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 13/939,301

(22) Filed: Jul. 11, 2013

(65) Prior Publication Data
US 2014/0022398 A1    Jan. 23, 2014

(30) Foreign Application Priority Data
Jul. 20, 2012 (JP) ................. 2012-161965

(51) Int. Cl.
*H04N 1/00* (2006.01)
*G06F 3/14* (2006.01)

(52) U.S. Cl.
CPC .......... *H04N 1/00127* (2013.01); *G06F 3/1454* (2013.01); *H04N 1/00209* (2013.01); *G06F 2221/2111* (2013.01); *G09G 2370/025* (2013.01); *G09G 2370/04* (2013.01); *G09G 2370/16* (2013.01); *H04N 2201/0015* (2013.01); *H04N 2201/0084* (2013.01); *H04N 2201/3246* (2013.01); *H04N 2201/3274* (2013.01); *H04N 2201/3278* (2013.01)

(58) Field of Classification Search
CPC .......... G06F 2221/2111; G06F 3/1454; G09G 2370/025; H04N 1/00127; H04N 1/00209; H04N 2201/0084; H04N 2201/3246; H04N 2201/3274; H04N 2201/3278

USPC ....................................... 348/207.1
See application file for complete search history.

(56) References Cited

U.S. PATENT DOCUMENTS

| | | | | |
|---|---|---|---|---|
| 7,062,576 B2* | 6/2006 | Ohmura | ............... | G11B 27/105 348/207.1 |
| 2006/0285559 A1* | 12/2006 | Cheng | ................ | H04N 21/4122 370/522 |
| 2008/0122935 A1* | 5/2008 | Ohmura | ............. | H04N 1/00291 348/207.1 |
| 2008/0192129 A1* | 8/2008 | Walker | ................. | G11B 27/034 348/231.2 |

(Continued)

FOREIGN PATENT DOCUMENTS

CN   1881196 A   12/2006
JP   2010-154267 A   7/2010

OTHER PUBLICATIONS

SIPO Office Action dated Feb. 3, 2016.

*Primary Examiner* — Amy Hsu
(74) *Attorney, Agent, or Firm* — Fitzpatrick, Cella, Harper & Scinto (57) ABSTRACT

An information processing apparatus connectable to a contents providing apparatus obtains a list of the identifiers of contents saved in the contents providing apparatus, and obtains accessibility information of the contents saved in the contents providing apparatus. Based on the obtained accessibility information, the information processing apparatus specifies at least one identifier of contents set to be accessible, among the identifiers of the obtained list. The information processing apparatus sets the specified identifier as parameters of a first program for accepting a user operation of designating the content. The information processing apparatus specifies the at least one identifier using a second program different from the first program.

20 Claims, 8 Drawing Sheets

(56) References Cited

U.S. PATENT DOCUMENTS

| | | | |
|---|---|---|---|
| 2010/0066839 A1* | 3/2010 | Azuma | G11B 27/034 348/207.1 |
| 2011/0019725 A1 | 1/2011 | Keller | 375/222 |
| 2011/0109725 A1* | 5/2011 | Yu et al. | 348/47 |
| 2011/0128389 A1* | 6/2011 | Maeda | H04N 1/00204 348/207.1 |
| 2011/0218018 A1* | 9/2011 | Phillips | G06F 17/30247 455/556.1 |
| 2012/0127328 A1* | 5/2012 | Winbush, III | H04N 5/23206 348/207.1 |

* cited by examiner

INFORMATION PROCESSING APPARATUS AND CONTROL METHOD FOR SPECIFYING AT LEAST ONE IDENTIFIER OF CONTENTS

BACKGROUND OF THE INVENTION

1. Field of the Invention

The present invention relates to an information processing apparatus and information processing method.

2. Description of the Related Art

In recent years, along with popularization of devices called smartphones and tablet terminals, a user has become able to enjoy browsing photos using a smartphone or tablet terminal or uploading an image to a server on a network. There is a demand to process, in a smartphone or tablet terminal, image data shot by a digital camera having an image capturing function as the main function. That is, as the function of a cellular terminal such as a smartphone or tablet terminal advances, the user can comfortably use a high-quality image browsing function including accessing a cloud in the cellular terminal, thereby increasing the number of use cases in which an image is used in the cellular terminal. There is also an increasing demand to use an image in a cellular terminal, for example, to use an image shot by a single-lens reflex digital camera for a blog or SNS, or to transfer a shot image to the cellular phones of friends to share it.

To cope with such use cases, it is convenient to connect a smartphone to a cellular terminal (for example, a digital camera) to allow the smartphone to browse image data of the digital camera. However, a cellular terminal may also browse image data the user of the digital camera does not want to show. Japanese Patent Laid-Open No. 2010-154267 (to be referred to as literature 1 hereinafter) is known as a technique for browsing security by a digital camera. Literature 1 discloses an arrangement in which if a security mode is set in an image playback mode, it is impossible to browse image data unless user authentication processing is performed.

Literature 1, however, does not consider a case in which another apparatus such as a smartphone browses image data of a digital camera. In the security mode, the user needs to perform an authentication operation every time, thereby complicating the user operation. When transferring images shot by a digital camera to a cellular terminal such as a smartphone or tablet device, therefore, a complicated user operation is required not to transfer images which should not be browsed by the cellular terminal.

SUMMARY OF THE INVENTION

According to an embodiment of the present invention, there are disclosed an information processing apparatus, image providing apparatus, image transfer system, and control method for the apparatuses and system, which can impose a restriction on image browsing without complicating the user operation when an apparatus different from an apparatus storing image data browses the image data.

According to one aspect of the embodiments, there is provided an information processing apparatus connectable to a contents providing apparatus, comprising: a first obtaining unit configured to obtain a list of identifiers of contents saved in the contents providing apparatus; a second obtaining unit configured to obtain accessibility information of the contents saved in the contents providing apparatus; a specifying unit configured to specify, based on the accessibility information obtained by the second obtaining unit, at least one identifier of contents set to be accessible among the identifiers of the list obtained by the first obtaining unit; and a setting unit configured to set the at least one identifier specified by the specifying unit as parameters of a first program for accepting a user operation of designating a content, wherein the specifying unit specifies the at least one identifier using a second program different from the first program.

Also, according to another aspect of the embodiments, there is provided a control method for an information processing apparatus connectable to a contents providing apparatus, comprising: a first obtaining step of obtaining a list of identifiers of contents saved in the contents providing apparatus; a second obtaining step of obtaining accessibility information of the contents saved in the contents providing apparatus; a specifying step of specifying, based on the accessibility information obtained in the second obtaining step, at least one identifier of contents set to be accessible among the identifiers of the list obtained in the first obtaining step; and a setting step of setting the at least one identifier specified in the specifying step as parameters of a first program for accepting a user operation of designating a content, wherein in the specifying step, the at least one identifier is specified using a second program different from the first program.

Furthermore, according to further aspect of the present invention, there is provided a computer-readable storage medium storing a program for causing a computer of an information processing apparatus connectable to a contents providing apparatus to function as a first obtaining unit configured to obtain a list of identifiers of contents saved in the contents providing apparatus, a second obtaining unit configured to obtain accessibility information of the contents saved in the contents providing apparatus, a specifying unit configured to specify, based on the accessibility information obtained by the second obtaining unit, at least one identifier of contents set to be accessible among the identifiers of the list obtained by the first obtaining unit, and a setting unit configured to set the at least one identifier specified by the specifying unit as parameters of a first program for accepting a user operation of designating a content, wherein the specifying unit specifies the at least one identifier using a second program different from the first program.

Further features of the present invention will become apparent from the following description of exemplary embodiments with reference to the attached drawings.

DESCRIPTION OF THE EMBODIMENTS

A preferred embodiment of the present invention will be described below with reference to the accompanying drawings.

Figure 1:
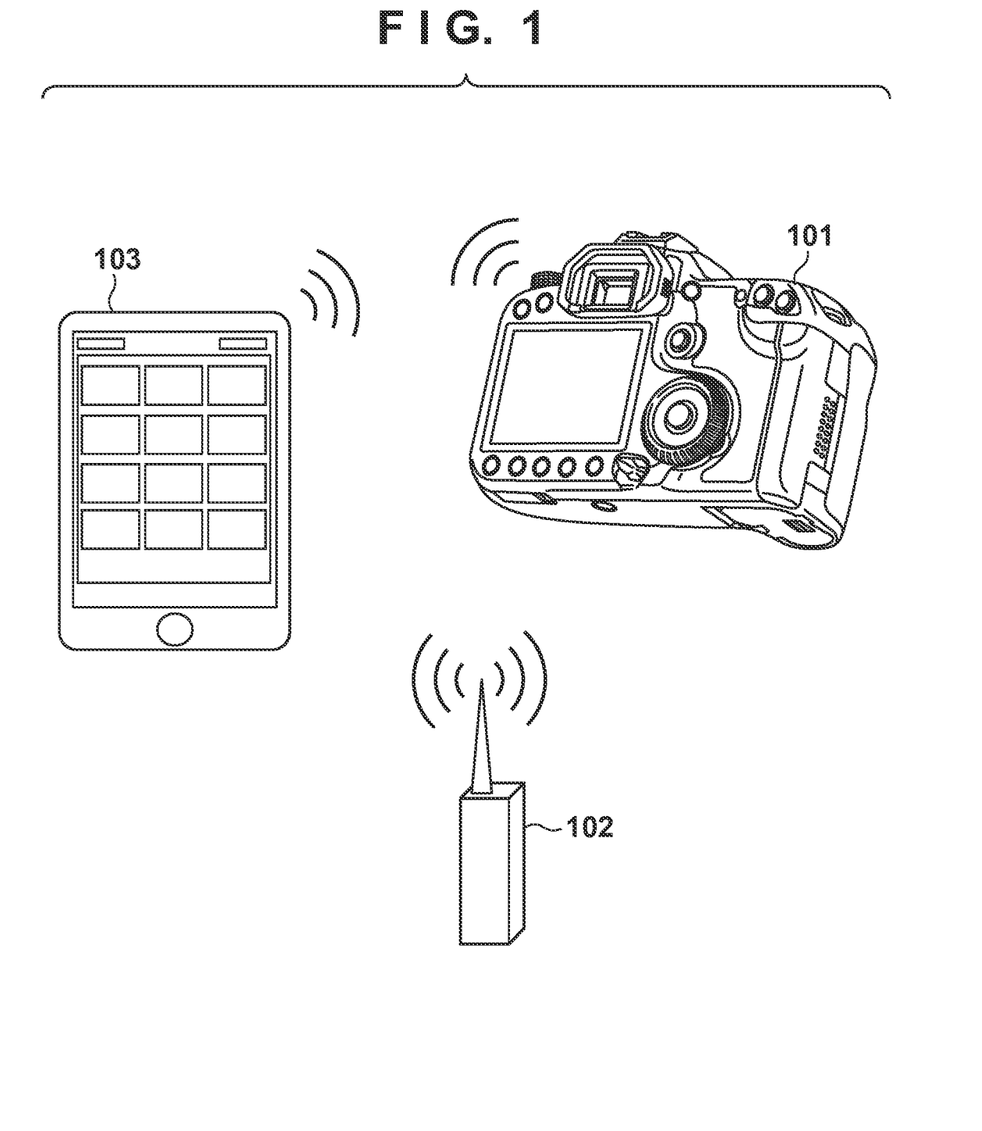
FIG. 1 is a view showing an example of a system configuration including a digital camera and cellular phone according to an embodiment.

FIG. 1 is a view showing an example of the configuration of a communication system according to the embodiment. As shown in FIG. 1, the communication system of the embodiment is formed by a digital camera 101 as an example of an image providing apparatus, an access point 102, and a cellular phone 103 as an example of an information processing apparatus including a communication apparatus. Note that the image providing apparatus includes a storage unit for storing images to be provided to an external apparatus, and a communication unit for providing the images to the external apparatus. The image providing apparatus is not limited to a digital camera, and an image viewer, an image server, a smartphone, or the like may serve as an image providing apparatus. Furthermore, the information processing apparatus which receives images is not limited to the cellular phone 103 to be exemplified below. Any apparatus such as a smartphone, tablet terminal, or printer on which an application for obtaining images from the image providing apparatus operates is applicable as the information processing apparatus according to the embodiment.

The digital camera 101 is an apparatus having a so-called image capturing function as the main function, for which a single-lens reflex digital camera is used in this embodiment. The digital camera 101 also has a wireless communication function which can communicably connect to the access point 102. The cellular phone 103 has a wireless communication function which can connect to the access point 102 in addition to a public network. Note that the communication apparatus is not limited to the cellular phone 103 and, for example, a tablet terminal, a personal computer, a media player, or the like can be used.

The digital camera 101 and cellular phone 103 can communicably be connected to each other via the access point 102. In this embodiment, a wireless LAN is used as a wireless communication method. Although a case in which the digital camera 101 and cellular phone 103 are connected to each other in the infrastructure mode has been explained, they may be connected in the ad hoc mode. Like Wi-Fi Direct, the digital camera 101 may serve as a simple access point, thereby directly connecting the cellular phone 103 to the digital camera 101 in the infrastructure mode.

Image data to be transmitted/received in the embodiment include still images and moving images shot by the digital camera 101. In addition to shot still image files and moving image files, the image data to be transmitted/received in the embodiment include files having undergone resize processing or rate conversion for transmission.

<Arrangement of Digital Camera>

Figure 2:
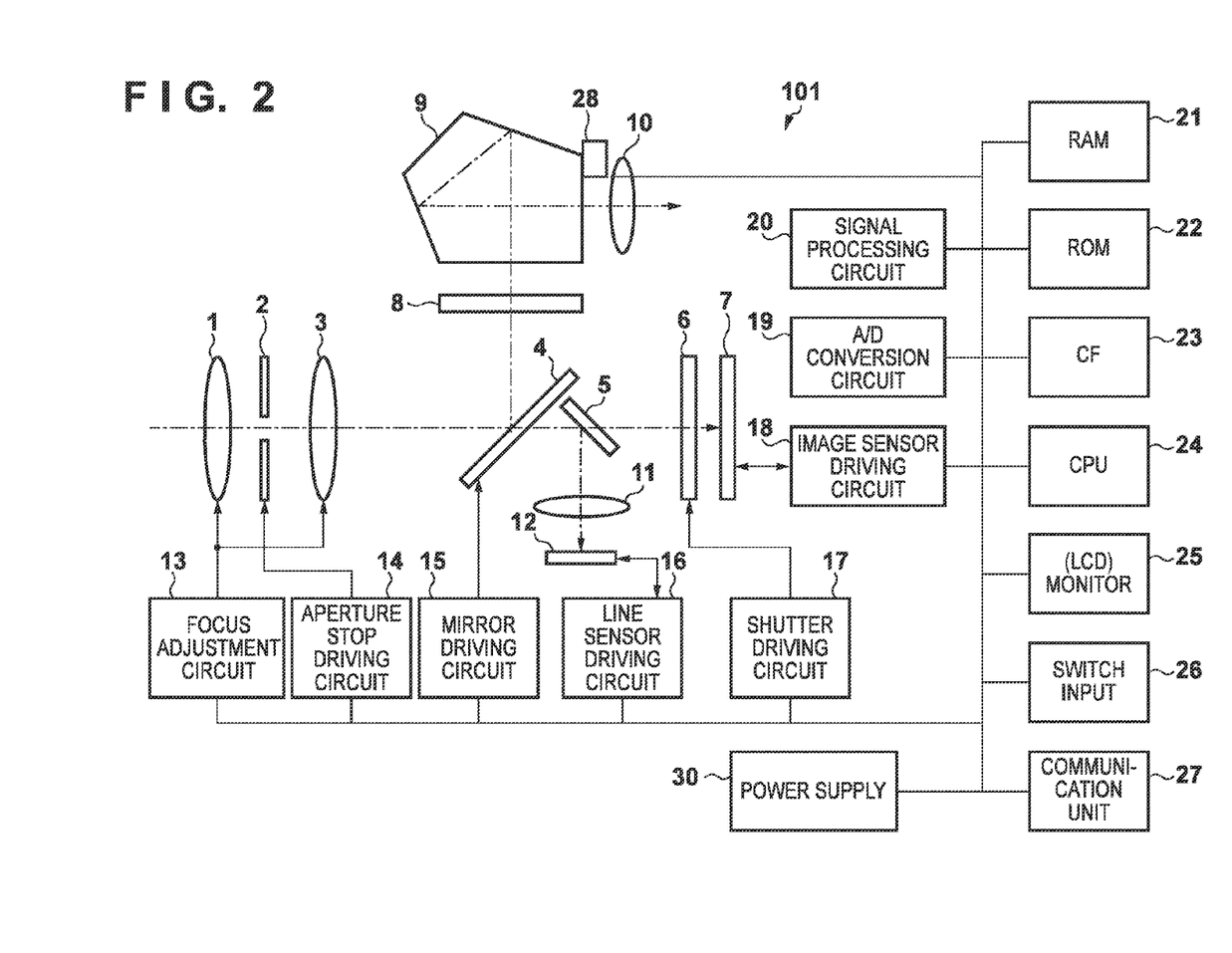
FIG. 2 is a block diagram showing the schematic arrangement of the digital camera according to the embodiment.

FIG. 2 is a block diagram showing the schematic arrangement of the digital camera 101. Reference numerals 1 and 3 denote photographing lenses. Although FIG. 2 shows two lenses for descriptive convenience, a number of lenses are actually included. Reference numeral 2 denotes an aperture stop which adjusts the amount of light having passed through the photographing lens 1 or 3; 4, a main mirror which is obliquely arranged with respect to a shooting optical path as shown in FIG. 2 when observing an object image by a viewfinder system, and is set in a state (not shown) in which it is retracted from the shooting optical path in capturing an image; and 5, a sub-mirror which reflects a light beam having passed through the main mirror 4 toward a focus detection lens 11 and line sensor 12 which are arranged in the lower portion of a camera body.

Reference numeral 6 denotes a shutter; 7, an image sensor which is formed by a CCD image sensor or CMOS image sensor; 8, a liquid crystal display unit which is incorporated in a viewfinder, and displays a focusing screen arranged on the expected imaging surface of the photographing lens 1 or 3, a distance measurement frame mark, and the like; 9, a pentaprism serving as a prism for changing the viewfinder optical path; 10, an eyepiece lens through which the user can observe an object; 11, the focus detection lens; 12, the line sensor, the output signal of which is used for focus detection; and 28, an A/D conversion circuit which includes a photometry circuit arranged above the viewfinder optical path, and A/D-converts the output of the photometry circuit.

Reference numeral 13 denotes a focus adjustment circuit which is arranged to drive the photographing lenses 1 and 3 and performs focus adjustment; 14, an aperture stop driving circuit which is arranged in the photographing lenses 1 and 3 and drives the aperture stop 2; 15, a mirror driving circuit which drives the main mirror 4; 16, a line sensor driving circuit which drives the line sensor 12; 17, a shutter driving circuit which drives the shutter 6; 18, an image sensor driving circuit which drives the image sensor 7; 19, an A/D conversion circuit which converts an analog shooting signal output from the image sensor 7 into a digital shooting signal; and 20, a signal processing circuit which executes signal processing for the digital shooting signal.

Reference numeral 21 denotes a RAM which temporarily saves a digital image signal and the like; 22, a ROM which stores a control program for controlling the digital camera 101, and the like; and 23, a Compact Flash® (CF) 23 which serves as a recording medium for finally recording the digital image signal. The CF 23 functions as a storage unit for storing images to be provided to an external device but the storage unit is not limited to the CF 23. Various storage media such as an SD card and hard disk can be used. Reference numeral 24 denotes a CPU which is a central processing unit for controlling each unit of the digital camera 101; and 25, a rear liquid crystal display (to be referred to as an LCD hereinafter) which displays, for example, a shot image corresponding to a captured digital image signal, a menu for changing shooting parameters, and a live view image.

Figure 3:
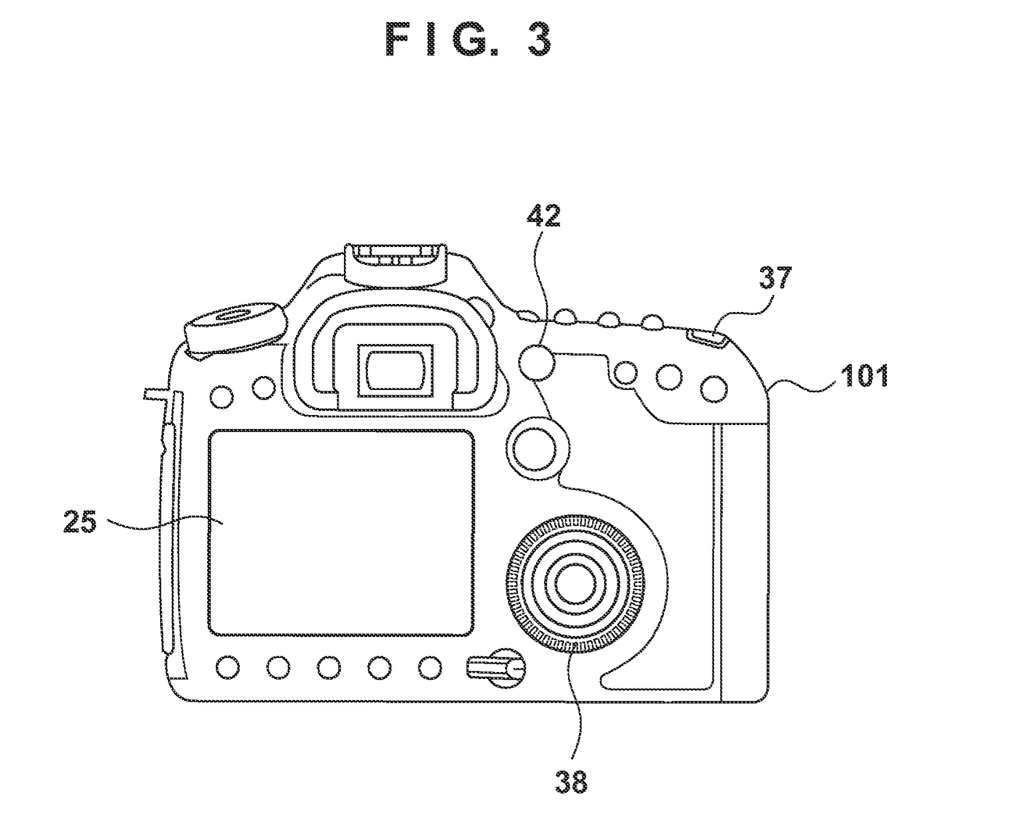
FIG. 3 is a view showing the outer appearance on the rear side of the digital camera according to the embodiment.

Reference numeral 26 denotes a switch input unit which inputs a signal corresponding to the operation of each of various buttons such as a release switch (to be referred to as a release SW hereinafter) operated by a shutter button 37, various function buttons, a selection subdial 38, and a power switch, as shown in FIG. 3. When the user operates a given button, the switch input unit 26 sends a corresponding signal to the CPU 24. The release SW is formed by a switch having at least two or more contacts, and is configured to, for example, switch the state between two stages in accordance with the amount of pressing. If the release SW is pressed halfway, the first contact (SW1) is selected. If the release SW is fully pressed, the second contact (SW2) is selected. Upon selecting SW1, the CPU 24 performs a shooting preparation operation such as an AF (Auto Focus) or AE (Auto Exposure) operation. On the other hand, upon selecting SW2, the CPU 24 performs a shooting operation, digital image signal generation operation, and recording operation.

Reference numeral 27 denotes a communication unit which includes an interface such as a LAN (Local Area Network) or USB (Universal Serial Bus) interface. The communication unit 27 connects to an external device such as the cellular phone 103, thereby enabling transmission of an image shot by the digital camera 101 and remote control of the digital camera 101 by the external device. Reference numeral 30 denotes a power supply which supplies power for driving the digital camera 101. A rechargeable battery such as a lithium ion battery is generally used as the power supply 30.

FIG. 3 is a view showing the outer appearance on the rear side of the digital camera 101. The shutter button 37 for turning on/off the release SW is disposed on the upper surface of the body of the digital camera 101. The selection subdial 38, a live view start/end button 42, and the LCD 25 for confirmation of a shot image and display of a function menu are disposed on the rear surface of the body. The switch input unit 26 sends information about the operation of each of the various switches and dial to the CPU 24, which then comprehensively controls the digital camera 101 according to the status of the operated button and the like.

<Arrangement of Cellular Phone>

Figure 4:
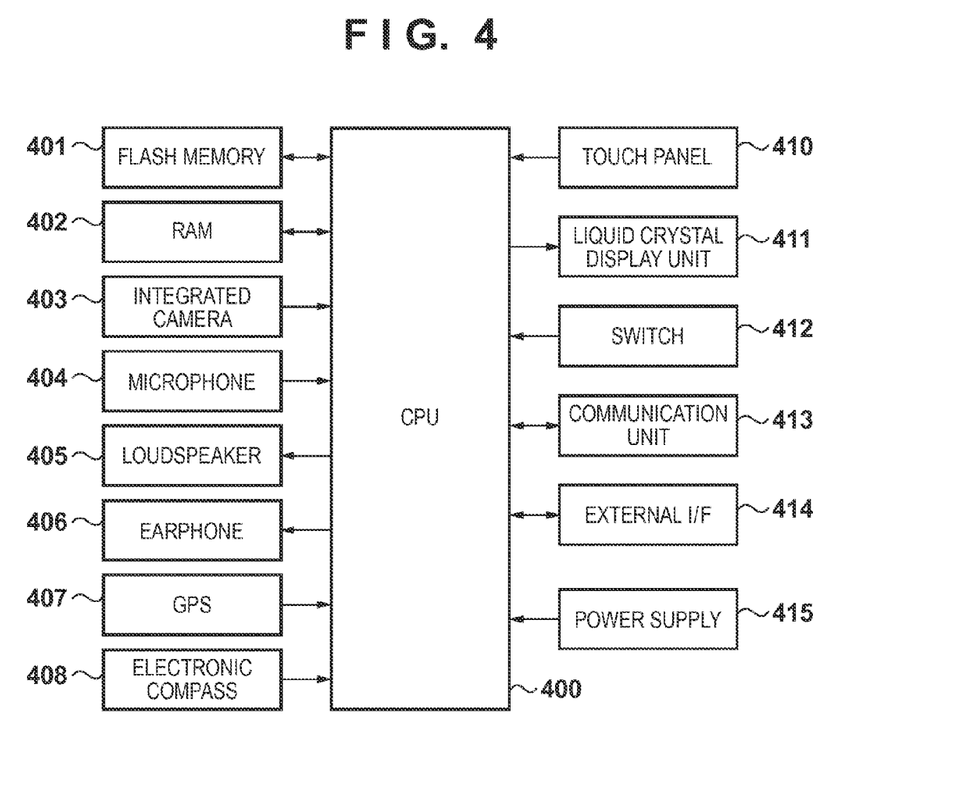
FIG. 4 is a block diagram showing the hardware configuration of the cellular phone according to the embodiment.

FIG. 4 is a block diagram showing the hardware configuration of the cellular phone 103 according to the embodiment. A CPU 400 comprehensively controls processing executed by the cellular phone 103. A flash memory 401 stores various contents such as digital photo images and moving images captured by an integrated camera 403, various control programs to be executed by the CPU 400, various application programs, and the like. A RAM 402 is used as a work area for the CPU 400, and temporarily stores various data such as contents to be processed by the CPU 400, and various application programs.

A liquid crystal display unit 411 is, for example, an LCD such as a TFT (Thin Film Transistor), or an GELD (Organic Electro-Luminescence Display). The liquid crystal display unit 411 displays an application UI (User Interface). The liquid crystal display unit 411 is integrally formed with a touch panel 410. The touch panel 410 detects a touch operation by the user while a photo or GUI (Graphical User Interface) is displayed on the liquid crystal display unit 411 by executing an application, and notifies the CPU 400 of it. The touch panel 410 is of, for example, a resistive film type or electrostatic capacitance type. However, other types may be possible. During execution of a photo display application, for example, the touch panel 410 allows the user to select a photo to display it in full screen, and enlarge or reduce an image by a pinch-out or pinch-in operation.

A switch 412, for example, a power switch or start button accepts a user operation and the like which cannot be input through the touch panel 410, and transfers an input signal to the CPU 400. An earphone 406 and loudspeaker 405 output audio signals stored in the flash memory 401 or input from a communication unit 413, an external I/F 414, or the like. A microphone 404 is used to input an audio signal when, for example, executing the telephone function of the cellular phone 103.

The communication unit 413 executes communication processing with another device via a network such as the Internet or a LAN (Local Area Network). The communication unit 413 may include a wireless LAN module or WWAN (Wireless Wide Area Network) module. In this embodiment, the cellular phone 103 communicates with the communication unit 27 of the digital camera 101 via the communication unit 413, and receives an image provided by the digital camera 101. The external I/F (interface) 414 exchanges an application and content data complying with the various standards such as USB and HDMI standards. A close proximity wireless communication function such as Bluetooth may be included. A power supply 415 is a power supply for the cellular phone 103, for which a rechargeable battery such as a lithium ion battery is generally used.

<Application Configuration>

Figure 5:
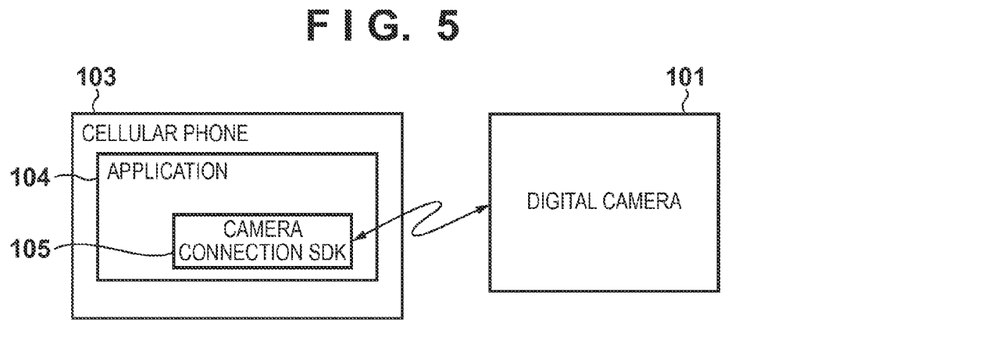
FIG. 5 is a view for explaining the configuration of an application started in the cellular phone, and connection with the digital camera according to the embodiment.

FIG. 5 shows an example of the software configuration according to the embodiment. To browse image data of the digital camera 101 using the cellular phone 103 according to the embodiment, it is necessary to install an application 104 as a first program. The application 104 is application software mainly used to process image data of the digital camera 101. The user can download the application 104 from, for example, a predetermined server on the Internet, and install it on the cellular phone 103. The application 104 includes, as a library, a camera connection SDK 105 (to be simply referred to as an SDK 105 hereinafter) as a second program which serves as a communication module with the digital camera 101. The cellular phone 103 on which the application 104 has been installed directly communicates with the digital camera 101 via the SDK 105.

<Basic Communication Processing>

An operation when connecting the digital camera 101 to the cellular phone 103 will be described next. The user of the cellular phone 103 operates it to start the application 104. On the other hand, the user of the digital camera 101 (who may be the user of the cellular phone 103) operates the menu or the like of the digital camera 101 to instruct connection to an external device. The digital camera 101 joins a network, and searches the network for a device using UPnP (Universal Plug and Play).

At this time, if the cellular phone 103 has started the application 104, the cellular phone 103 detects the digital camera 101. The cellular phone 103 displays device information of the detected digital camera 101 on itself. If the user performs a connection operation in the cellular phone 103 to instruct to select the displayed digital camera 101, the cellular phone 103 sends a connection response to the digital camera 101.

The digital camera 101 notifies the user that the connection response has been received from the cellular phone 103, and displays the device as a connection partner (the transmission source of the connection response), thereby confirming it with the user. This processing will be referred to as pairing. Once pairing is established, the digital camera 101 stores connection setting information such as settings of the access point and the ID or MAC address of the cellular phone 103, and registers it as a connection setting. The registered device is added to a connection destination list displayed on the digital camera 101. After pairing is established, if the user of the digital camera 101 selects the cellular phone 103 from the connection destination list, connection is automatically established as long as the application 104 is active in the cellular phone 103. Note that the digital camera 101 can register a plurality of pieces of connection setting information.

Figure 6A:
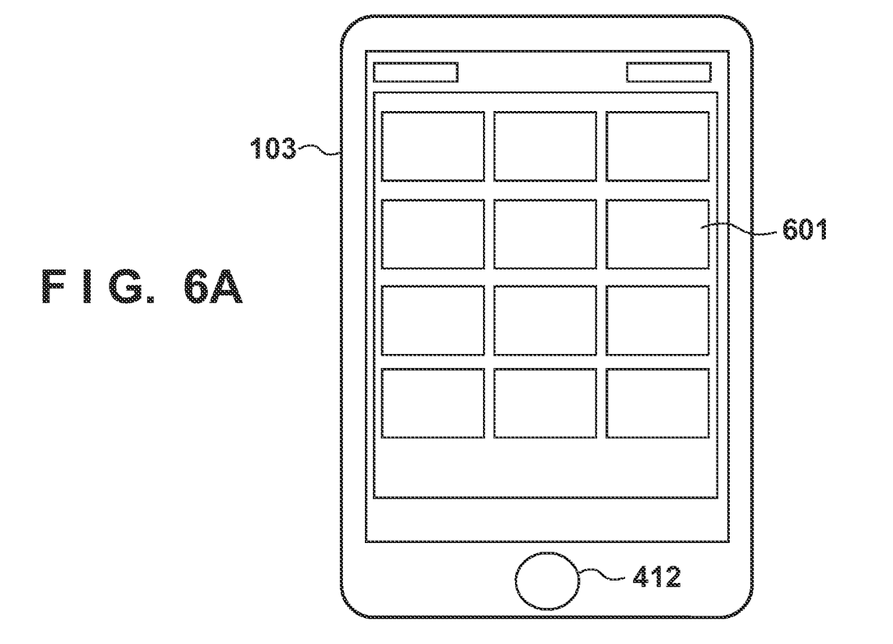
FIGS. 6A and 6B are views for explaining the UI of the application according to the embodiment.

A basic operation after the digital camera 101 and cellular phone 103 are connected to each other will be described below. After the digital camera 101 and cellular phone 103 are connected to each other, the digital camera 101 transmits the thumbnails of its own image data to the cellular phone 103. Upon receiving the thumbnail images, the cellular phone 103 displays a list of thumbnails 601 on the screen of the application 104, as shown in FIG. 6A.

Figure 6B:
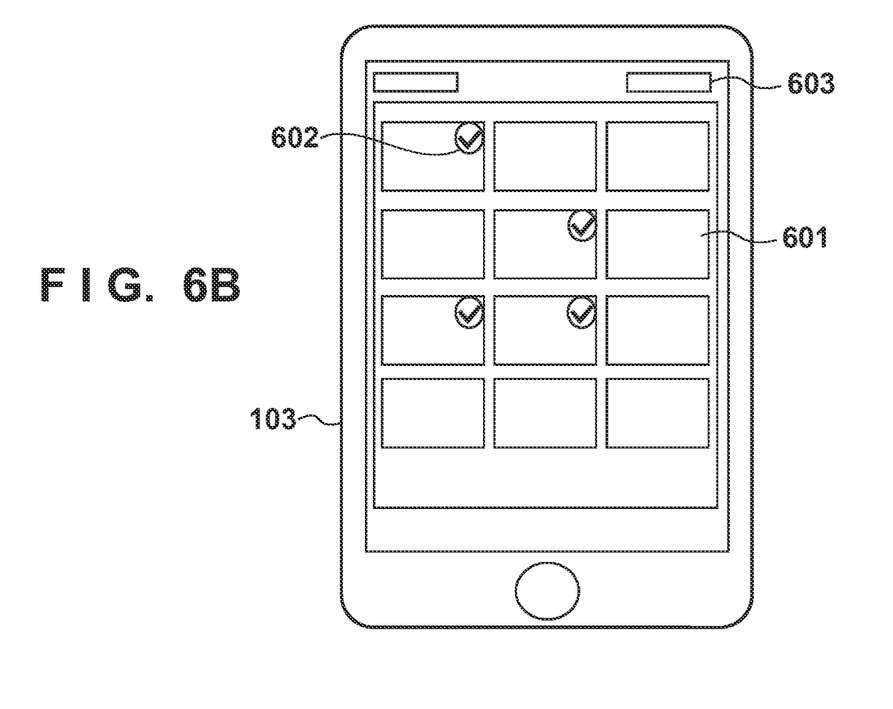

The user of the cellular phone 103 taps, among the displayed thumbnails, the thumbnail of image data to be loaded into the cellular phone 103. The tapped thumbnail is added with a checkmark 602, and enters a selection state, as shown in FIG. 6B. If the user of the cellular phone 103 taps a load execution button 603 after selecting images, the cellular phone 103 requests image data corresponding to the selected thumbnails of the digital camera 101. Upon receiving the request, the digital camera 101 transmits the requested image data to the cellular phone 103.

This processing makes it possible to load the image data of the digital camera 101 into the cellular phone 103. The loaded image data is browsable on the cellular phone 103 side. It is also possible to upload the loaded image data to a server or the like using the function of the cellular phone 103. Note that instead of transmitting the image data of the digital camera 101 to the cellular phone 103 without any change, the digital camera 101 can perform resize processing for the image data so that it has a designated image size, and transmit the generated resized image data. Note that the image size may be designated by performing an operation in the digital camera 101 or cellular phone 103. The basic operation of loading the image data of the digital camera 101 into the cellular phone 103 has been described.

<Use Cases>

The aforementioned basic operation allows the cellular phone 103 to freely access image data of the digital camera 101. The aforementioned operation hardly causes problems as long as the user of the digital camera connects it to his/her cellular phone. However, for example, if the user of the digital camera connects it to the cellular phone of another user, it may be undesirable that the cellular phone freely accesses the image data of the digital camera. For example, the user wants to give image data shot in an event on a specific date to his/her friend but does not want to show private image data shot on other days. Alternatively, if the digital camera holds a large number of images, and opens all the image data to a cellular phone, it may be difficult for the user of the cellular phone to find desired images. In an image transfer system according to the embodiment, the user of the cellular phone 103 can browse only image data permitted by the user of the digital camera 101.

<Browsing Restriction Setting>

An operation, in the digital camera 101, of making a setting to restrict browsing on the cellular phone 103 side will be schematically described. FIGS. 7A to 7E are views each showing an example of a GUI for setting a browsing restriction, which is displayed on the digital camera 101. FIG. 8A is a flowchart for explaining image browsing restriction information setting processing in the digital camera 101. Image browsing restriction information is, for example, accessibility information for restricting access to browse images. The digital camera 101 according to the embodiment holds identification information for identifying an information processing apparatus which have undergone wireless connection (pairing) in the past, and restriction information indicating an image browsing restriction is registered in association with the identification information using a GUI to be described below. A case in which identification information of a plurality of cellular phones (smartphones) is held will be exemplified below.

In response to a user operation of the digital camera 101, the CPU 24 displays, on the LCD 25, a list of information processing apparatuses indicated by the identification information held as information processing apparatuses (cellular phones) which have undergone pairing (step S801). If one information processing apparatus is selected from the list by a user operation of the digital camera 101, the process advances to processing of providing a GUI for setting a browsing restriction for the selected information processing apparatus (YES in step S802, and step S803).

Figure 7A:
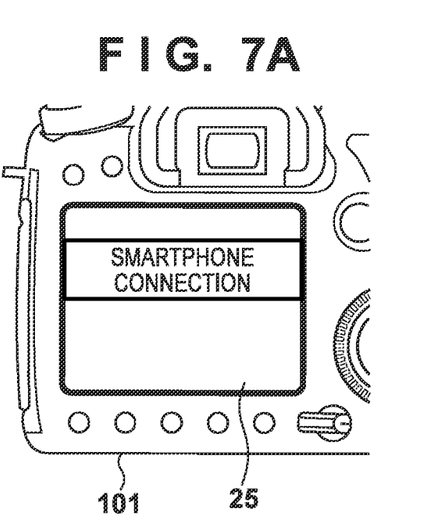
FIGS. 7A to 7E are views for explaining the setting UI of the digital camera for setting a browsing restriction function according to the embodiment.
Figure 7B:
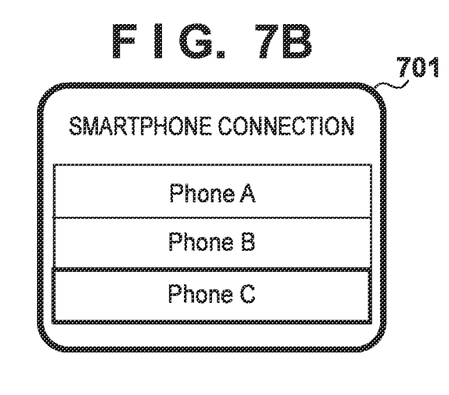
Figure 8A:
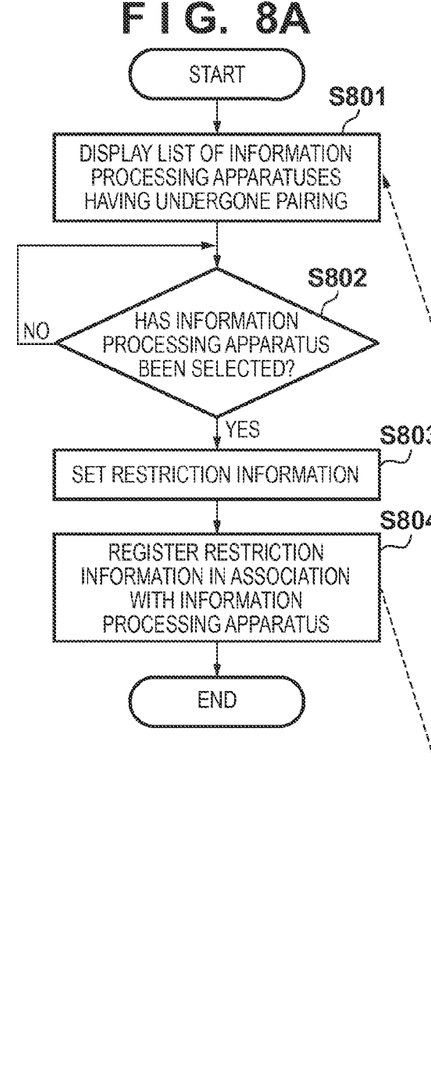
FIGS. 8A and 8B are flowcharts for explaining the operation of the digital camera according to the embodiment.

If, for example, smartphone connection is selected from the connection setting menu for the cellular phone 103, as shown in FIG. 7A, which is displayed on the LCD 25 of the digital camera 101, a list 701 of registered cellular phones 103 is displayed on the LCD 25, as shown in FIG. 7B. The user of the digital camera 101 selects a desired cellular phone from the list 701. The following description will be provided on the assumption that "Phone C" has been selected from the list 701. Note that since a desired cellular phone is selected from the list 701, and restriction information is set, it is possible to individually set restriction information for a plurality of cellular phones.

Figure 7C:
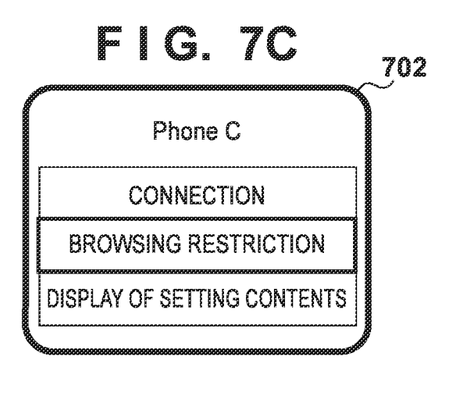

If "Phone C" is selected by a user operation, a submenu 702 is displayed, as shown in FIG. 7C. In the submenu 702, "connection" is an item for instructing connection to "Phone C", "browsing restriction" is an item for setting a browsing restriction on "Phone C", and "display of setting contents" is an item for displaying the current setting contents associated with "Phone C".

Figure 7D:
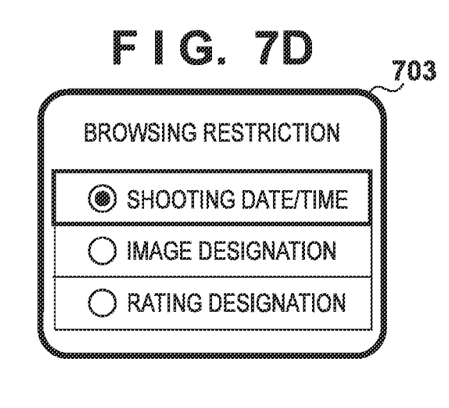

If "browsing restriction" is selected from the submenu 702 shown in FIG. 7C, a screen shown in FIG. 7D is displayed. A setting menu 703 for selecting a criterion on which browsing is restricted is displayed in the screen. In this embodiment, it is possible to select a desired restriction criterion from three restrictions: a restriction by "shooting date/time", a restriction by "image designation", and a restriction by "rating designation". Note that the browsing restriction is not limited to them, and it may be possible to use a combination of two or all of the three restrictions. If a browsing restriction criterion is selected, a GUI corresponding to the selected criterion is provided, and the user can set a browsing restriction through the GUI. The browsing restriction setting will be described later. Upon completion of setting of browsing restriction information as described above, the restriction information is held in association with identification information of the information processing apparatus selected from the list 701 shown in FIG. 7B (step S804). The digital camera 101 can individually set restriction information for a plurality of information processing apparatuses.

Figure 7E:
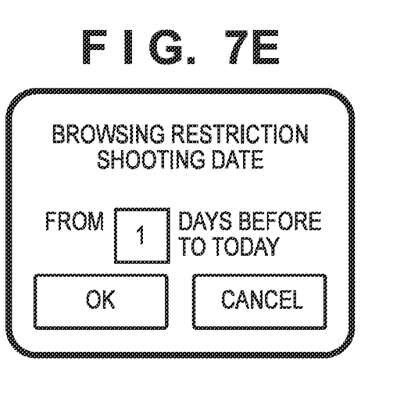

Browsing restrictions according to the embodiment will be described in more detail below. A restriction by "shooting date" allows an external apparatus to browse only image data shot at a specific date/time. In other words, a restriction is imposed so that an external apparatus cannot browse image data shot at dates/times other than the specific date/time. As a setting method, for example, the number of past days from today on which images permitted for browsing are shot is designated, as shown in FIG. 7E. If "0" is set, only image data shot today can be browsed. Note that "today" in this setting method indicates a date on which the digital camera is connected to the cellular phone 103. If, therefore, the digital camera is reconnected to the cellular phone 103 on another day in this setting, "today" indicates the other day, and thus only image data shot on the day when reconnection is performed. That is, if such setting is made for the smartphone of a friend whom the user often meets in an event or the like, the user can share only image data shot in an even on a day without changing the settings by only performing connection in an event venue.

A restriction by "image designation" allows an external apparatus to browse only images desired by the user. In an image designation method according to the embodiment, the start image and end image of image data to be browsable are set by a user operation in list display of image data sorted based on a predetermined sort condition. In this case, the start image, the end image, and images between them are set as browsable images. If "image designation" is selected in the screen shown in FIG. 7D, a list of images is displayed in, for example, the file name order or shooting date/time order, and it becomes possible to select two image data (start point and end point) by a user operation. Image data between the two selected image data are selected as browsing targets. With this operation, the user can readily set, as browsing targets, only image data shot within a predetermined range, for example, in one event.

A restriction by rating designation allows an external apparatus to browse only image data having a designated rating. The rating in the embodiment is a numerical value indicating a so-called favorite rating of the user. The user can add an arbitrary value (rating) to each image data by operating the digital camera 101. If "rating designation" is selected in the screen shown in FIG. 7D, a screen for designating (selecting) a rating value is displayed. Upon designation (selection) of a rating value by a user operation, a setting is made to allow an external apparatus to browse only image data added with the selected value. Note that image data added with a rating value larger than the selected value (having a high favorite rating) may be set as browsing targets.

A browsing restriction setting method has been explained. As described above, if the digital camera 101 sets a browsing restriction, it becomes possible to prevent image data from being unintentionally browsed without prompting the user of the cellular phone 103 to input a password. That is, it becomes possible to appropriately restrict browsing without making the user of the cellular phone 103 perform a complicated operation. Note that the restriction information setting method is not limited to the above-described "shooting date/time", "image designation", and "rating designation".

<Communication>

As described above, the digital camera 101 can set to restrict browsing of image data by the cellular phone 103. Processing when the digital camera 101 and cellular phone 103 are connected to each other after setting a browsing restriction will be described below.

Figure 8B:
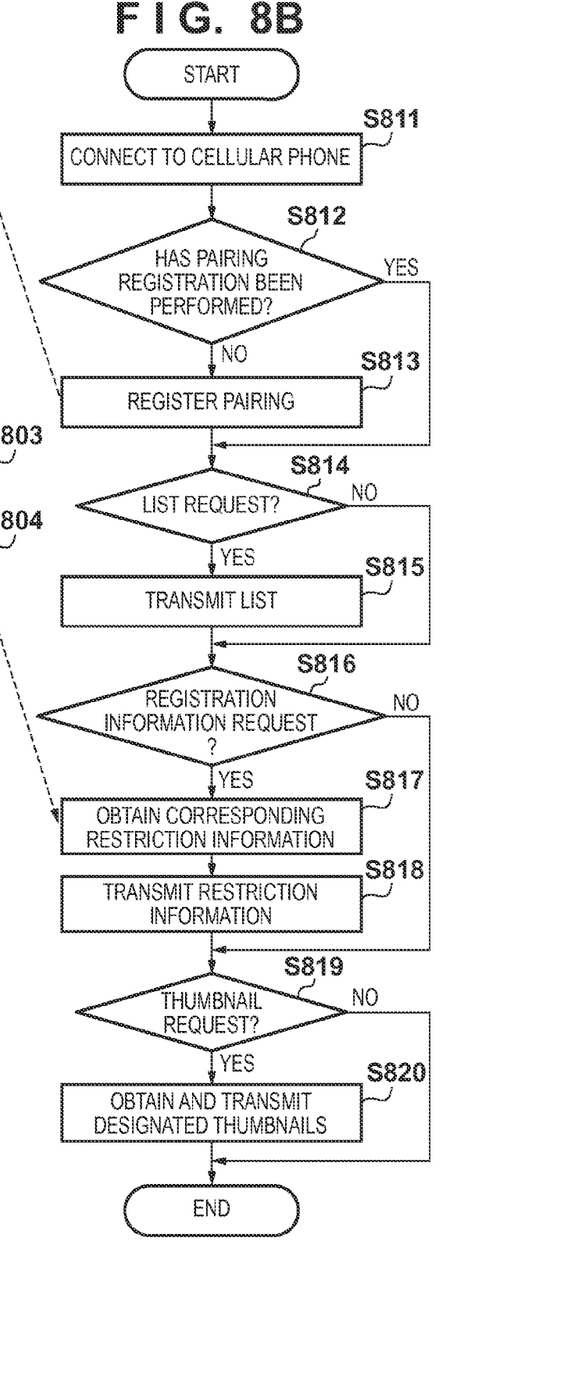
Figure 9:
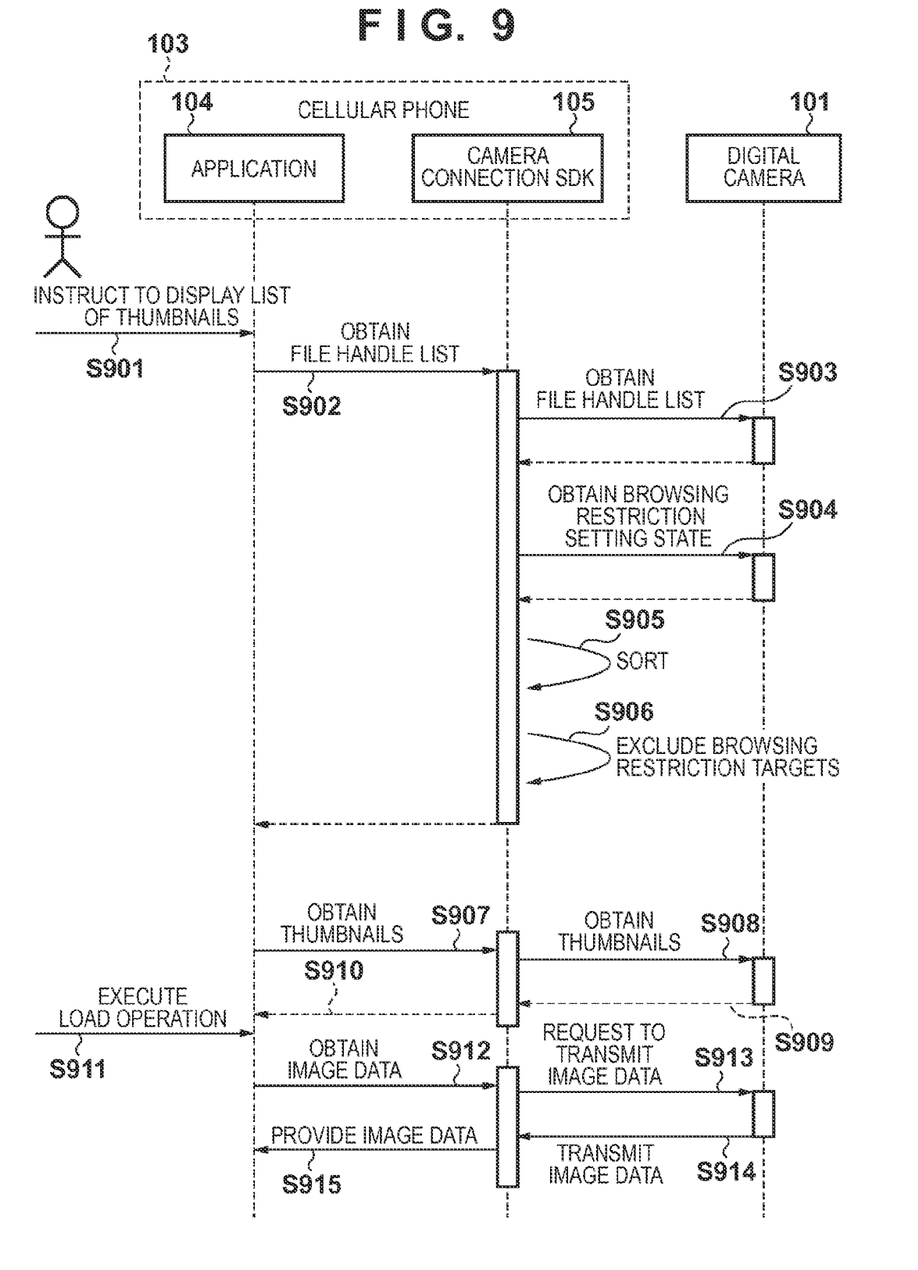
FIG. 9 is a sequence chart showing browsing restriction function processing according to the embodiment.

FIG. 9 is a sequence chart showing processing executed when the digital camera 101 and cellular phone 103 are connected to each other in a wireless LAN layer. FIG. 8B is a flowchart illustrating processing executed by the digital camera 101 in the processing shown in FIG. 9. The processing will be described below by dividing it into processing performed by the CPU 24 of the digital camera 101, processing performed by the CPU 400 of the cellular phone 103 by executing the application 104, and processing performed by the CPU 400 of the cellular phone 103 by executing the SDK 105. Note that although "application 104" or "SDK 105" is used for descriptive convenience in a description of FIG. 8, the software itself is not the entity of the processing, and hardware (the CPU 400 or the like) which loaded the software executes each process.

When the digital camera 101 and cellular phone 103 are connected to each other, the CPU 400 of the cellular phone 103 starts the application 104. As the application 104 starts, the SDK 105 also starts. The application 104 displays a menu screen on the liquid crystal display unit 411. The menu screen includes an instruction field for instructing to display a list of the thumbnails of image data of the digital camera 101.

In step S901, the application 104 accepts an instruction to display a list of thumbnails by a user operation. Upon accepting the instruction to display a list of thumbnails, the application 104 requests the SDK 105 to obtain a file handle list of the digital camera 101 in step S902. A file handle in this example indicates ID information for identifying a file or the like. The digital camera 101 adds a file handle to each file of its own, and manages them as a list.

On the other hand, when connecting to the cellular phone 103 (step S811), the CPU 24 of the digital camera 101 determines whether pairing with the connected cellular phone 103 has been registered (step S812). If pairing has not been registered, the CPU 24 newly holds identification information of the currently connected cellular phone 103 as an information processing apparatus having undergone connection (pairing) (step S813). The held identification information is reflected on display of the list shown in FIG. 7B, thereby enabling setting of image browsing restriction information.

In step S903, the SDK 105 transmits a file handle list obtaining request to the digital camera 101. In response to this, the digital camera 101 transmits the file handle list to the cellular phone 103 (YES in step S814, and step S815), and the SDK 105 receives the file handle list. The file handle list includes, for example, a list of the identifiers of contents held in the digital camera 101.

In step S904, the SDK 105 inquires of the digital camera 101 about a browsing restriction setting for this connection. Upon accepting a restriction information request, the digital camera 101 obtains restriction information registered in association with the currently connected cellular phone 103 (identification information thereof) (steps S816 and S817), and transmits it to the cellular phone 103 (step S818). The SDK 105 receives the restriction information indicating the browsing restriction setting from the digital camera 101.

Based on the restriction information received from the digital camera 101, the SDK 105 extracts browsable file handles from the file handle list received from the digital camera 101. In step S905, the SDK 105 sorts the file handles of the received file handle list based on an item for which a restriction is designated by the restriction information. If, for example, the restriction information designates a browsing restriction by "shooting date/time", the SDK 105 sorts the file handles based on shooting dates/times. In step S906, the SDK 105 refers to the browsing restriction setting, and deletes, from the file handle list, the file handles of image data as browsing restriction targets (image data which are not to be browsed) among the sorted file handles of the file handle list. In this way, the SDK 105 generates a filtered file handle list including only browsable file handles restricted by the browsing restriction, and transfers it to the application 104.

In step S907, the application 104 designates file handles based on the file handle list transferred by the SDK 105, thereby requesting the SDK 105 to obtain thumbnails. In response to the request of thumbnails by the application 104, the SDK 105 transmits a thumbnail obtaining request to the digital camera 101 in step S908. The digital camera 101 receives the obtaining request (step S819), and transmits, to the cellular phone 103, the thumbnails of files corresponding to the file handles contained in the obtaining request (steps S820 and S909). Upon receiving the thumbnails, the SDK 105 transfers them to the application 104 (step S910). The application 104 displays the thumbnails on the liquid crystal display unit 411.

With the above processing, the list of the thumbnails 601 as shown in FIG. 6A is displayed on the liquid crystal display unit 411 of the cellular phone 103. The subsequent processing is the same as that described with reference to FIG. 6B. That is, in step S909, the user of the cellular phone 103 adds the checkmark 602 to a desired image among the displayed thumbnails 601, and selects it. Upon completion of selection of images, the user taps the load execution button 603.

If the load execution button 603 is tapped (step S911), the cellular phone 103 requests image data corresponding to the selected thumbnails of the digital camera 101 (step S912). That is, the application 104 notifies the SDK 105 of the file handles of the checked image data, thereby instructing to obtain the image data. In response to the instruction, the SDK 105 transmits, to the digital camera 101, a request to transmit the image data of the sent file handles (step S913). Upon receiving the transmission request, the digital camera 101 transmits the requested image data to the cellular phone 103 (SDK 105) (step S914). The SDK 105 transfers the transmitted image data to the application 104 (step S915). With this operation, the digital camera 101 loads images into the cellular phone 103.

In this case, the thumbnails 601 displayed in the cellular phone 103 have already been restricted to those which meet the browsing restriction, and thus no images the owner of the digital camera 101 does not want to show are displayed. Furthermore, even if the digital camera 101 holds a large number of images, images to be displayed in the cellular phone 103 are restricted, thereby facilitating a search for desired images when selecting images in the cellular phone 103.

Note that a vendor extension command (to also be referred to as a vendor unique command) is used as a command used between the SDK 105 and the digital camera 101. There is provided a standard protocol such as PTP-IP (Picture Transfer Protocol over Internet Protocol) for communication with a digital camera. However, for connection with the cellular phone 103 in which a browsing restriction has been set, as in the embodiment, it is impossible to obtain images using such standard protocol (using a standard command). More specifically, the digital camera 101 is configured not to return handles in response to a command other than a vendor extension command, thereby preventing images other than browsing targets from being transferred. The application 104 which uses PTP-IP as a predetermined protocol for obtaining images cannot obtain images from the digital camera 101. Instead of the application, the SDK 105 obtains images from the digital camera 101 using the vendor extension command of the predetermined protocol (PIP-IP in this example).

The sequence of image data transmission according to the embodiment has been explained. According to the aforementioned sequence, if the digital camera 101 sets a browsing restriction, it is possible to restrict browsing of image data by the cellular phone 103 without the intention of the user of the cellular phone 103.

According to the image transfer processing described in the embodiment, the application 104 recognizes no browsing restriction. By including an intermediate program for intervention such as the SDK 105 according to the embodiment, the function of the SDK 105 can control a browsing restriction. The application 104, therefore, need only have a function of requesting file handles and executing various processes according to the transferred file handles. This arrangement makes it possible to customize the SDK 105 for the digital camera 101, and increase the degree of freedom of design of the application 104. Furthermore, for example, by opening the SDK 105 to be usable by a third-party application, the browsing restriction of the digital camera 101 can correctly function for not only the application 104 but also a third-party application.

As described above, according to the aforementioned embodiment, it is possible to impose a restriction on image browsing without complicating the user operation when an apparatus different from an apparatus storing image data browses the image data.

Other Embodiments

The present invention has been described in detail based on the preferred embodiment. The present invention, however, is not limited to the specific embodiment, and includes various forms without departing from the scope of the invention.

In the embodiment, for example, one-to-one connection between the digital camera 101 and the cellular phone 103 has been described. As an application, the aforementioned embodiment is applicable to a one-to-many simultaneous connection case such as a case in which one digital camera 101 is connected to a plurality of cellular phones 103. In image sharing, it is very effective to simultaneously transfer images shot in an event to a plurality of users in an event venue.

Note that if a plurality of cellular phones are connected to one digital camera, it is only necessary to notify each cellular phone of browsing restriction information set and registered for the cellular phone. As described above, the digital camera need only notify each cellular phone 103 as a connection destination of a browsing restriction setting condition for the cellular phone. That is, it is not necessary to generate a handle list or manage files for a browsing restriction for each cellular phone 103. Even if the number of cellular phones 103 increases, therefore, the browsing restriction set for each connection destination is enabled when the digital camera 101 only responds to a request from the cellular phone 103. Control of the digital camera 101 thus becomes significantly simple and easy.

An information processing apparatus for which corresponding image browsing restriction information has not been registered may not be permitted to browse all images. A method of imposing a browsing restriction on an information processing apparatus which has not been registered is not limited to this, as a matter of course. Such information processing apparatus may be permitted to browse all images, or the user may set whether to permit such information processing apparatus to browse all images. Alternatively, a predetermined restriction (for example, only images shot today) may be sent as a default value. A wireless LAN in the infrastructure (or ad hoc) mode is used as a communication connection for transmitting/receiving images in the image transfer system according to the embodiment. The present invention, however, is not limited to this. For example, wired communication such as USB or close proximity wireless communication such as Bluetooth may be used.

Moreover, the present invention is also implemented by executing the following processing. That is, the present invention is implemented by supplying software (a program) which implements the functions of the above-described embodiments to a system or apparatus via a network or various storage media, and reading out and executing the program by the computer (or CPU or MPU) of the system or apparatus.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-161965, filed Jul. 20, 2012, which is hereby incorporated by reference herein in its entirety.

What is claimed is:

1. An information processing apparatus connectable to a contents providing apparatus, comprising:
   a memory device configured to store a first program for accepting a user operation of designating first a content and a second program different from the first program;
   a first obtaining unit configured to obtain a list of identifiers of contents saved in the contents providing apparatus from the contents providing apparatus using the second program in response to receiving a request from the first program;
   a second obtaining unit configured to obtain accessibility information of the contents saved in the contents providing apparatus from the contents providing apparatus using the second program in response to receiving the request from the first program;
   a specifying unit configured to specify, based on the accessibility information obtained by the second obtaining unit, at least one identifier of contents set to be accessible among the identifiers of the list obtained by the first obtaining unit without a user operation, using the second program; and
   a passing unit configured to pass the at least one identifier specified by the specifying unit to the first program using the second program.

2. The apparatus according to claim 1, further comprising a third obtaining unit configured to obtain, from the contents providing apparatus, a content designated by the user operation among contents corresponding to the identifiers passed to the first program by the passing unit.

3. The apparatus according to claim 1, wherein the first obtaining unit obtains the list when instructed by a user operation.

4. The apparatus according to claim 1, wherein, in communication using the second program, the information processing apparatus communicates with the contents providing apparatus using a vendor unique command of a predetermined protocol.

5. The apparatus according to claim 4, wherein the first program is used for communication using a standard command of the predetermined protocol.

6. The apparatus according to claim 1, further comprising a generation unit configured to generate a list for the first program including the at least one identifier specified by the specifying unit.

7. The apparatus according to claim 1, wherein the accessibility information is date or time information.

8. The apparatus according to claim 1, wherein the accessibility information is rating information.

9. The apparatus according to claim 1, wherein
   the second program is called when a user instruction for displaying a list of images is received using the first program, and
   the first obtaining unit obtains the list of identifiers of contents saved in the contents providing apparatus using the second program when the user instruction for displaying a list of images is received using the first program.

10. The apparatus according to claim 1, wherein
   the first obtaining unit, the second obtaining unit, and the specifying unit automatically execute their functions using the second program when a user instruction for displaying a list of images is received using the first program, and
   the first obtaining unit, the second obtaining unit, and the specifying unit execute their functions using the second program without a further user instruction until the specifying unit completes specification of the at least one identifier, after the user instruction is received.

11. The apparatus according to claim 10, wherein the second program does not pass the at least one identifier to the first program until the specifying unit completes specification of the at least one identifier, after the list of identifiers is obtained by the first obtaining unit.

12. A control method for an information processing apparatus connectable to a contents providing apparatus, the method comprising:
   obtaining a list of identifiers of contents saved in the contents providing apparatus from the contents providing apparatus using a second program in response to receiving a request from a first program for accepting a user operation of designating a content, the first program being different from the second program;
   obtaining accessibility information of the contents saved in the contents providing apparatus from the contents providing apparatus using the second program in response to receiving the request from the first program;
   specifying, based on the obtained accessibility information, at least one identifier of contents set to be accessible among the obtained identifiers of the list without a user operation, using the second program; and
   passing the at least one specified identifier to the first program using the second program.

13. A non-transitory computer-readable storage medium storing a program that when executed causes a computer to perform a control method of an information processing apparatus connectable to a contents providing apparatus, the control method comprising:
   obtaining a list of identifiers of contents saved in the contents providing apparatus from the contents providing apparatus using a second program in response to receiving a request from a first program for accepting a user operation of designating a content, the first program being different from the second program,
   obtaining accessibility information of the contents saved in the contents providing apparatus from the contents providing apparatus using the second program in response to receiving the request from the first program,
   specifying, based on the obtained accessibility information, at least one identifier of contents set to be accessible among the obtained identifiers of the list without a user operation, using the second program, and
   passing the at least one specified identifier to the first program using the second program.

14. The non-transitory computer-readable storage medium according to claim 13, wherein the control method further comprises obtaining, from the contents providing apparatus, a content designated by the user operation among contents corresponding to the identifiers passed to the first program.

15. The non-transitory computer-readable storage medium according to claim 13, wherein obtaining of the list is instructed by a user operation.

16. The non-transitory computer-readable storage medium according to claim 13, wherein, in communication using the second program, a vendor unique command of a predetermined protocol is used to communicate with the contents providing apparatus.

17. The non-transitory computer-readable storage medium according to claim 16, wherein the first program is used for communication using a standard command of the predetermined protocol.

18. The non-transitory computer-readable storage medium according to claim 13, wherein the control method further comprises generating a list for the first program including the at least one specified identifier.

19. The non-transitory computer-readable storage medium according to claim 13, wherein the accessibility information is date or time information.

20. The non-transitory computer-readable storage medium according to claim 13, wherein the accessibility information is rating information.

* * * * *